(12) United States Patent
Igawa et al.

(10) Patent No.: US 6,209,911 B1
(45) Date of Patent: Apr. 3, 2001

(54) DRIVER SIDE AIR BAG

(75) Inventors: Tadahiro Igawa; Akiko Ohashi, both of Shiga-ken (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/151,446

(22) Filed: Sep. 11, 1998

(30) Foreign Application Priority Data

Nov. 29, 1996 (JP) .................................................. 8-319505

(51) Int. Cl.$^7$ .................................................. B60R 21/28
(52) U.S. Cl. .................. 280/740; 280/743.2; 280/743.1; 280/729; 280/728.2
(58) Field of Search ............................. 280/743.1, 743.2, 280/740, 728.2, 729, 731, 732

(56) References Cited

U.S. PATENT DOCUMENTS

| | | | |
|---|---|---|---|
| 5,172,933 | * 12/1992 | Strasser | 280/740 |
| 5,186,489 | * 2/1993 | Imai | 280/728 |
| 5,573,270 | * 11/1996 | Sogi et al. | 280/740 |
| 5,607,183 | * 3/1997 | Nishimura et al. | 280/743.2 |
| 5,669,632 | * 9/1997 | Johnson et al. | 280/743.2 |
| 6,022,046 | * 2/2000 | Isomura et al. | 280/743.2 |

FOREIGN PATENT DOCUMENTS 5-213143    8/1993   (JP) .

* cited by examiner

*Primary Examiner*—J. J. Swann
*Assistant Examiner*—J. Allen Shriver
(74) *Attorney, Agent, or Firm*—Foley & Lardner

(57) ABSTRACT

A driver side air bag, in which the impact applied to tether belts during the deployment of the air bag is small, and comprising a member, of which structure is quite simple, for controlling the direction of the flow of gases in the air bag is provided. Ends of tether belts 68 are inserted between tether belt connecting fabrics 64 and 66 and are sewn by sewing yarn. Each tether belt 68 is an elongated band and is sewn to the tether belt connecting fabrics 64, 66 at both ends of the tether belt 68 and sewn to the front panel at the center in the longitudinal direction of the tether belt 68. A sheet 70 is made in a loop configuration to overlap an opening 72 with an opening 74 and a ring-like flametight fabric 80 is disposed between the sheet 70 and a holding ring 82. Reinforcing fabrics 60, 62, the tether belt connecting fabrics 64, 66, and an air bag 34 are disposed between the sheet 70 and a retainer 46, then stud bolts 90 of the holding ring 82 are inserted into bolt through holes 86, 76, 42, 50, 54h, and nuts (not shown) are screwed onto the respective ends of the stud bolts 90. In this way, the sheet 70, the air bag 34, and the inflator 54 are fixed to the retainer 46.

9 Claims, 9 Drawing Sheets

DRIVER SIDE AIR BAG

TECHNICAL FIELD OF THE INVENTION

The present invention relates to an air bag of a driver side air bag device installed in a central portion of a steering wheel of a vehicle, and more particularly to a driver side air bag provided with a sheet-like member within a bag body thereof for controlling the direction of the flow of gases from an inflator.

BACK GROUND OF THE INVENTION

FIG. 5 is a perspective view showing an air bag for protecting a driver of an automobile (hereinafter, referred to "driver side air bag") in the deployed state, in which a bag body 14 of the air bag comprises a front panel 10 and a rear panel 12 each formed by a circular fabric and is made by sewing together the panels along the peripheries. The rear panel 12 is provided with an inflator-fitting opening 16 in the center thereof for receiving a front end of the inflator. The rear panel 12 is also provided with small holes 18 around the opening 16 through which bolts, pins, or rivets are inserted for fixing the bag body 14 to a retainer. Numeral 20 designates a vent hole for allowing gases in the bag body to escape outside when a driver plunges into the air bag.

In order to prevent the air bag from projecting forwardly during the deployment, the front panel 10 and the rear panel 12 are connected by tether belts 22 as shown in FIGS. 6–8. The tether belts 22 are sewn on the front panel 10. The tether belts 22 are also sewn on a ring-like fabric 24 disposed around the opening 16.

The bag body 14 is fixed to a retainer 30 and is covered by a module cover 32. When the air bag is deployed with gases from an inflator 54, the module cover 32 is torn and opened as shown in the drawing. The tether belts 22 are tensioned on the deployment of the air bag, thereby preventing the further advance of the front panel 10.

In Japanese Laid-open Patent No. 5-213143/1993, it is described that an inner air bag is disposed in an outer air bag and the inner air bag is in the same configuration as the outer air bag but with proportionally reduced dimensions. The inner air bag is formed in a bag shape by sewing together circular front and rear panels along the peripheries thereof in the same manner as the outer air bag. Therefore, it takes a great deal of man-hours to sew them.

Gases from the inflator are supplied into the inner air bag to inflate the inner air bag. The inner air bag is provided with a gas outlet on the rear side thereof so that the outer air bag is inflated with gases flowing out of the inner air bag through the gas outlet.

SUMMARY OF THE INVENTION

Using the tether belts 22 as shown in FIGS. 6–8 prevents the forward projection of the air bag. When the air bag is deployed, significantly large impact is applied to the tether belts 22. For that, it is necessary to quite securely sew the tether belts 22, the front panel 10, and the ring-like fabric 24. It takes a great deal of man-hours to sew them.

It is a first object of the present invention to provide a driver side air bag comprising a member, of which structure is quite simple, for controlling the direction of the flow of gases in the air bag.

It is a second object of the present invention to provide a driver side air bag in which the impact which is applied to tether belts during the deployment of the air bag is small.

A driver side air bag of the present invention comprises a bag body to be deployed in a circular shape and an inflator-fitting opening formed in a rear face of said bag body at the center of the rear face. A rectangular sheet having a central portion facing to said inflator-fitting opening and ends is fixed to said bag body around said inflator-fitting opening is disposed inside said bag body. Further, a driver side air bag of the present invention comprises a bag body to be deployed in a circular shape and an inflator-fitting opening formed in a rear face of said bag body at the center of the rear face. A cruciform sheet has a central portion facing to said inflator-fitting opening and extended portions extending in four directions from the central portion. The cruciform sheet is fixed to the bag body around the inflator-fitting opening. The cruciform sheet is disposed inside said bag body and each end of the sheet is provided with an inflator-inserting opening.

In the aforementioned driver side air bag, directions of gases from the inflator can be controlled in such a manner that the gases flow in the lateral direction of the sheet. When tether belts are disposed inside the air bag, impact applied to the tether belts during the deployment of the air bag can be reduced. The sheet employed in the present invention has a simple configuration so as to allow the easy manufacturing.

PREFERRED EMBODIMENTS OF THE INVENTION

Hereinafter, embodiments will be described with reference to the drawings.

Figure 1:
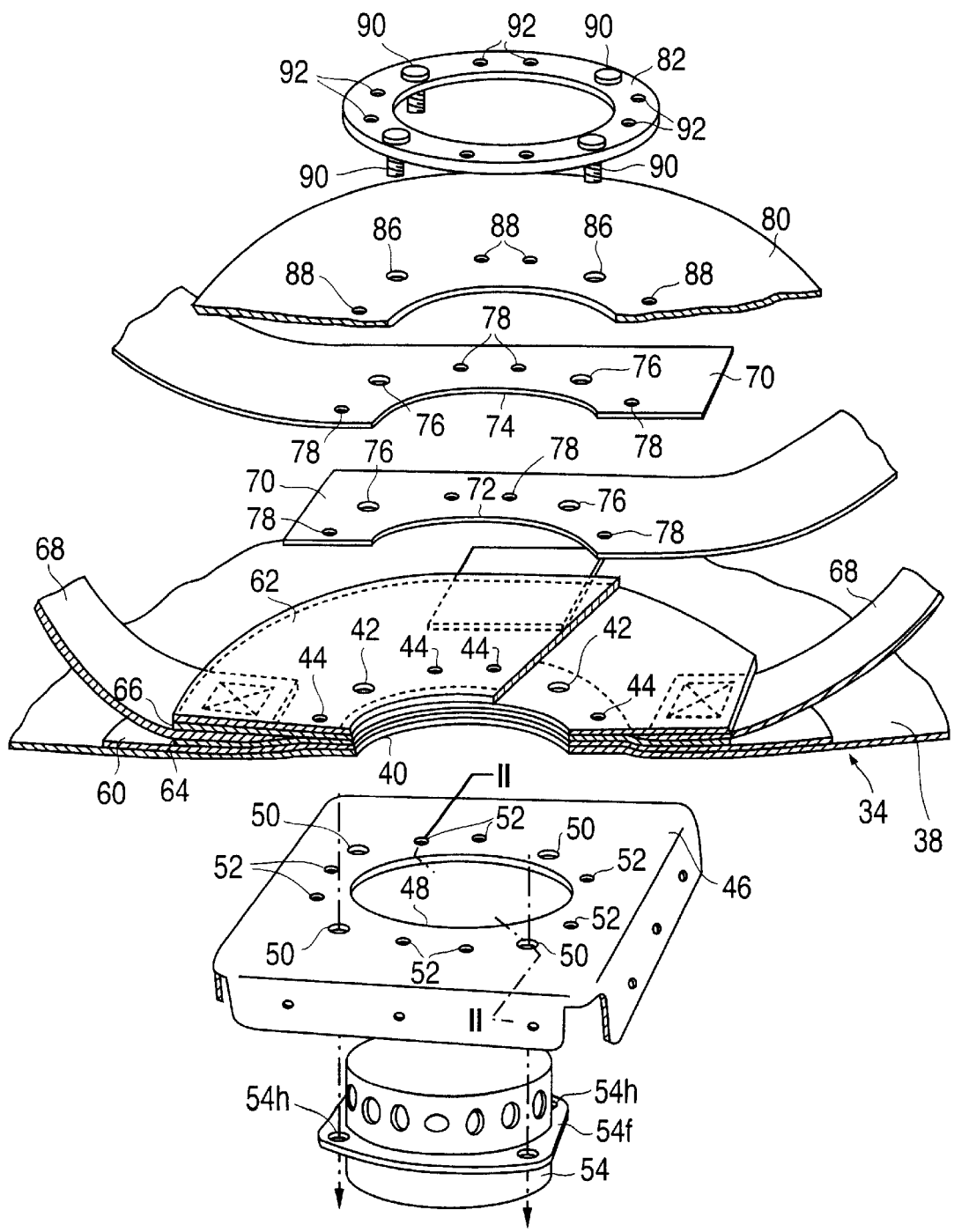
FIG. 1 is an exploded view of a driver side air bag according to an embodiment.
Figure 2:
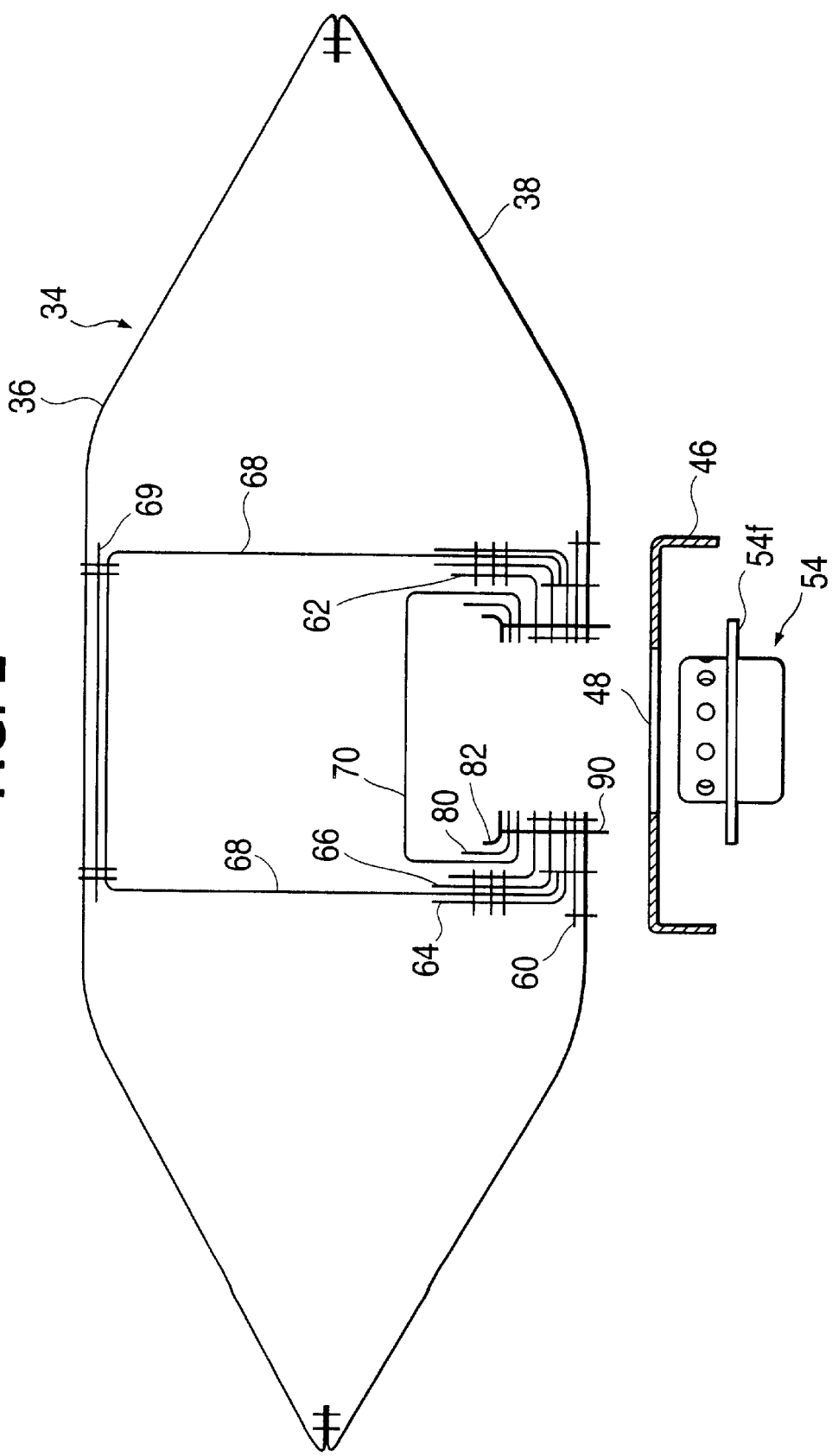
FIG. 2 is a sectional view of the driver side air bag according to the embodiment.
Figure 3:
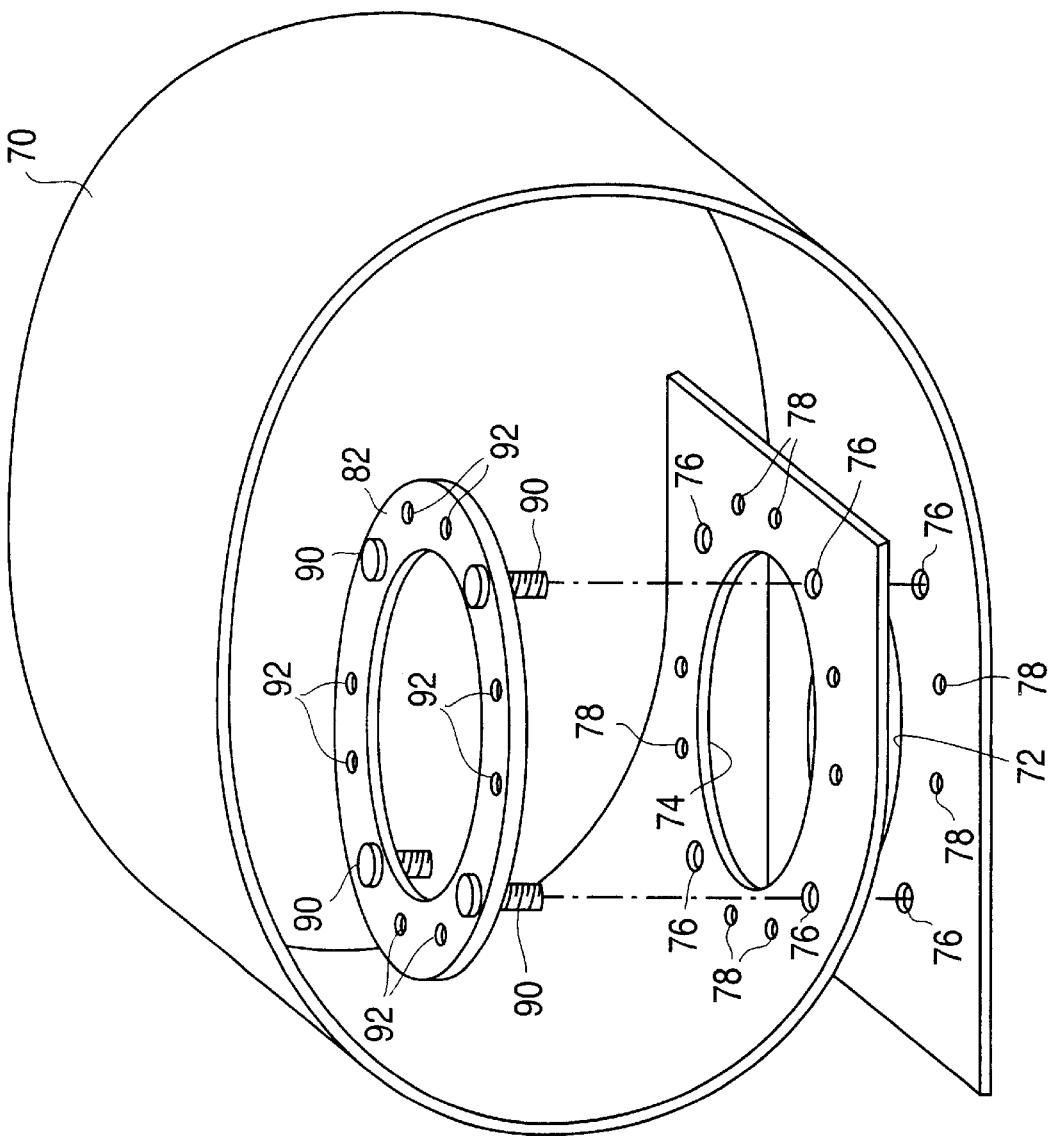
FIG. 3 is a perspective view showing a sheet 70 and a holding ring.
Figure 4:
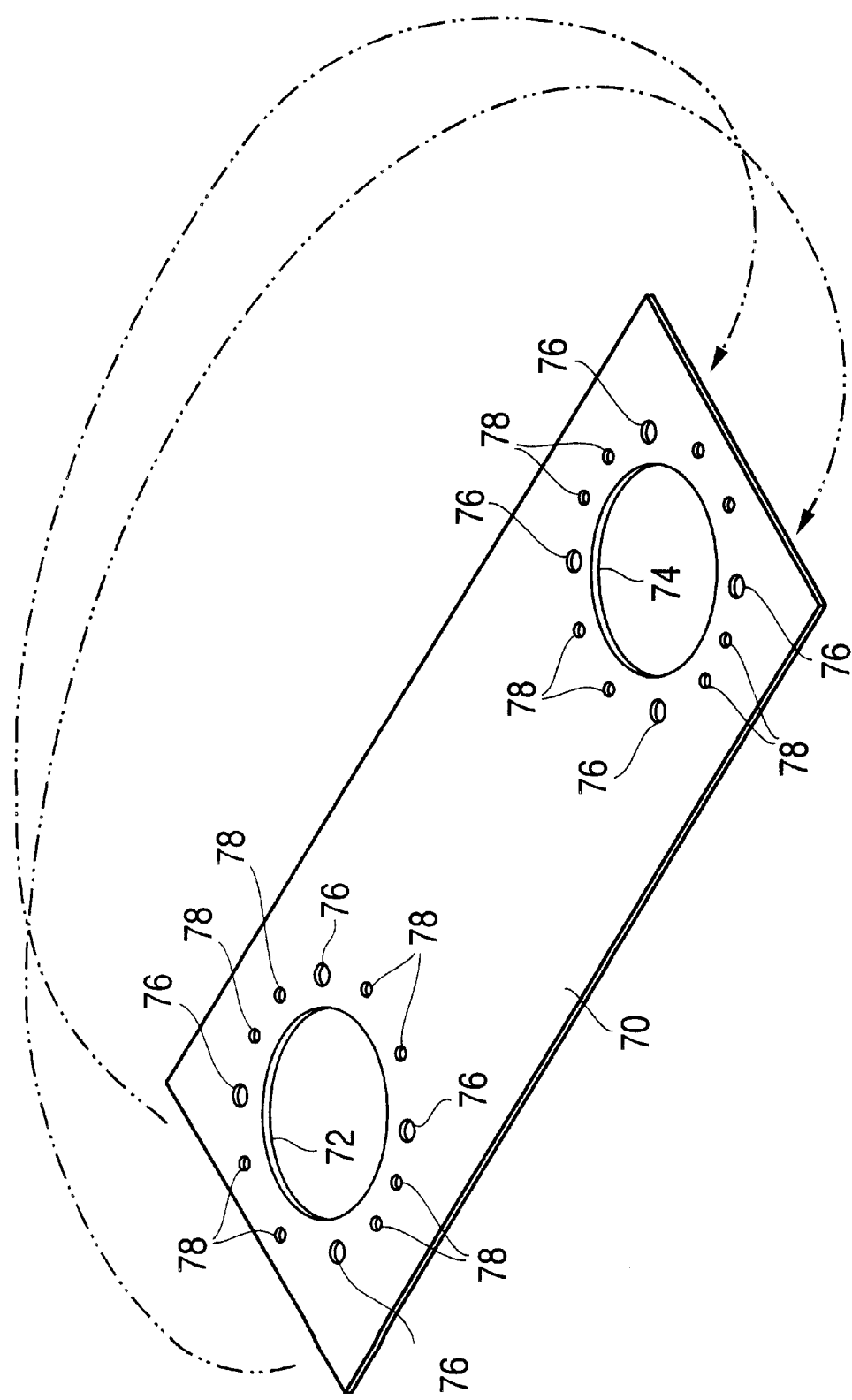
FIG. 4 is a perspective view showing the sheet 70.
Figure 5:
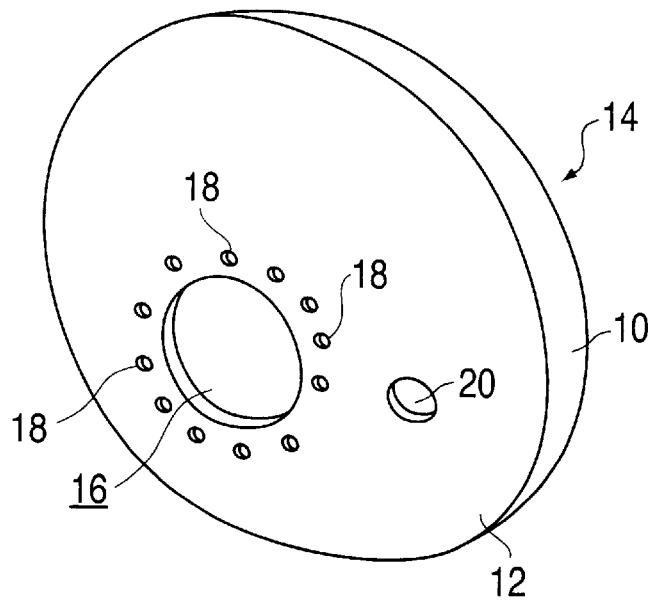
FIG. 5 is a perspective view of a conventional air bag.

FIG. 1 is an exploded perspective view showing an air bag according the present invention. FIG. 2 is a sectional view showing the same device as FIG. 1 taken along line II—II of FIG. 1. FIG. 3 is a perspective view showing a sheet in the air bag. FIG. 4 is a perspective view showing the sheet.

In this embodiment, the air bag 34 comprises a circular front panel 36 and a circular rear panel 38 which are sewn together along the peripheries of the panels 36, 38. The rear panel 38 is provided with an inflator-fitting opening 40 and a vent hole (not shown). Sewn on the rear panel 38 and integrated are provided with reinforcing fabrics 60, 62 and tether belt connecting fabrics 64, 66 which will be described later. The rear panel 38 and fabrics 60, 62, 64, 66 which are thus integrated are bolt through holes 42 and rivet through holes 44 around the inflator-fitting opening. It should be noted that the reinforcing fabric 62 may be omitted.

A retainer 46 for fixing the air bag 34 is provided with an inflator-mounting hole 48 and is also provided with bolt through holes 50 and rivet through holes 52 around the inflator-mounting hole 48. An inflator 54 has a flange 54f which is provided with bolt through holes 54h. Ends of tether belts 68 are inserted between the tether belt connecting fabrics 64 and 66, respectively, which are sewn on the air bag 34 along the inflator-fitting opening 40, and are sewn by sewing yarn.

Figure 6:
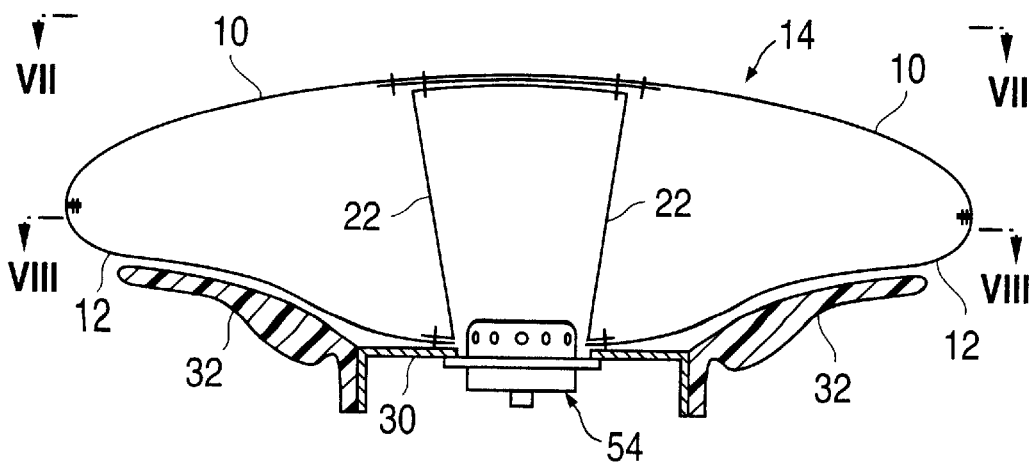
FIG. 6 is a sectional view of a conventional air bag device in a state that the air bag is deployed.
Figure 7:
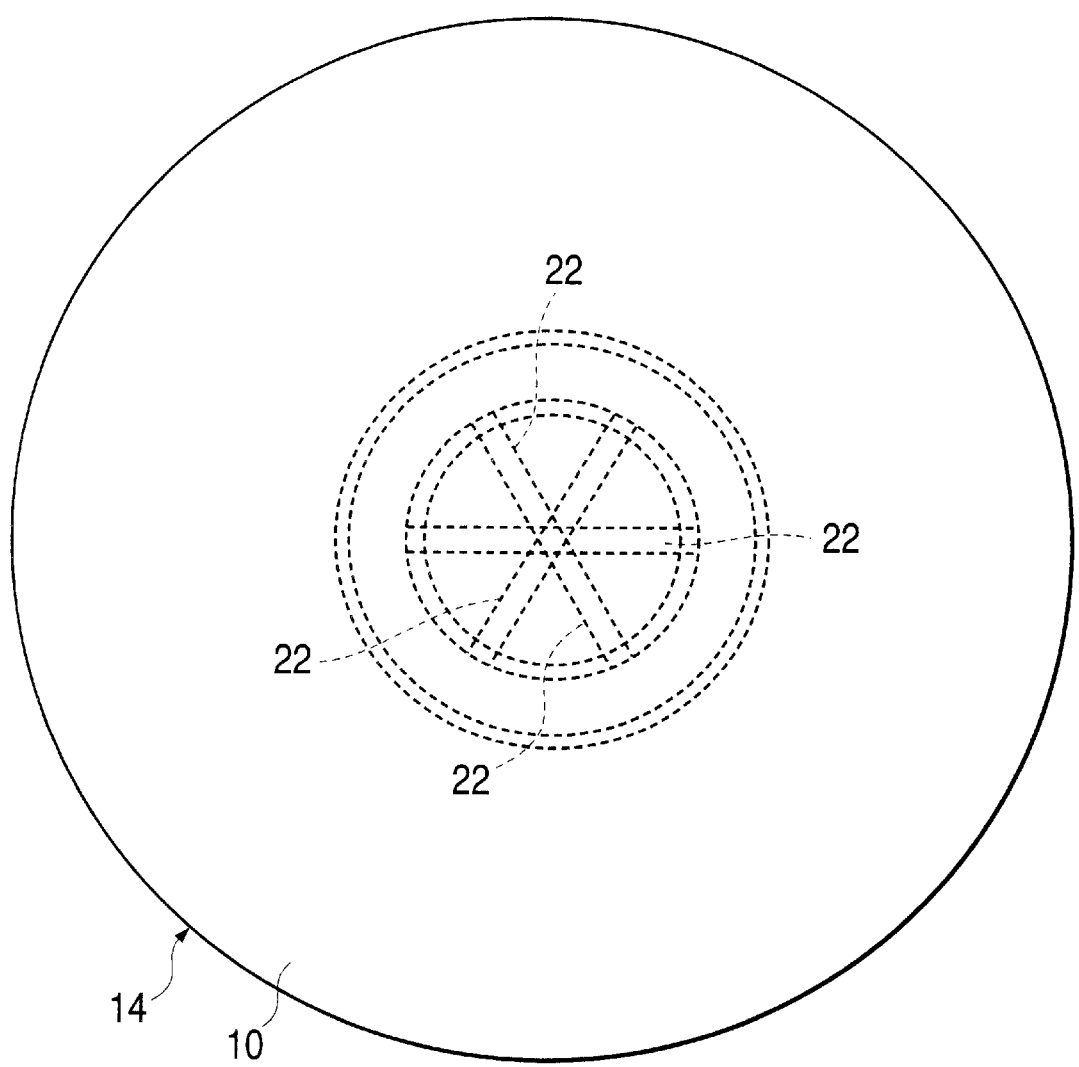
FIG. 7 is a structural view taken along a line VII—VII of FIG. 6.
Figure 8:
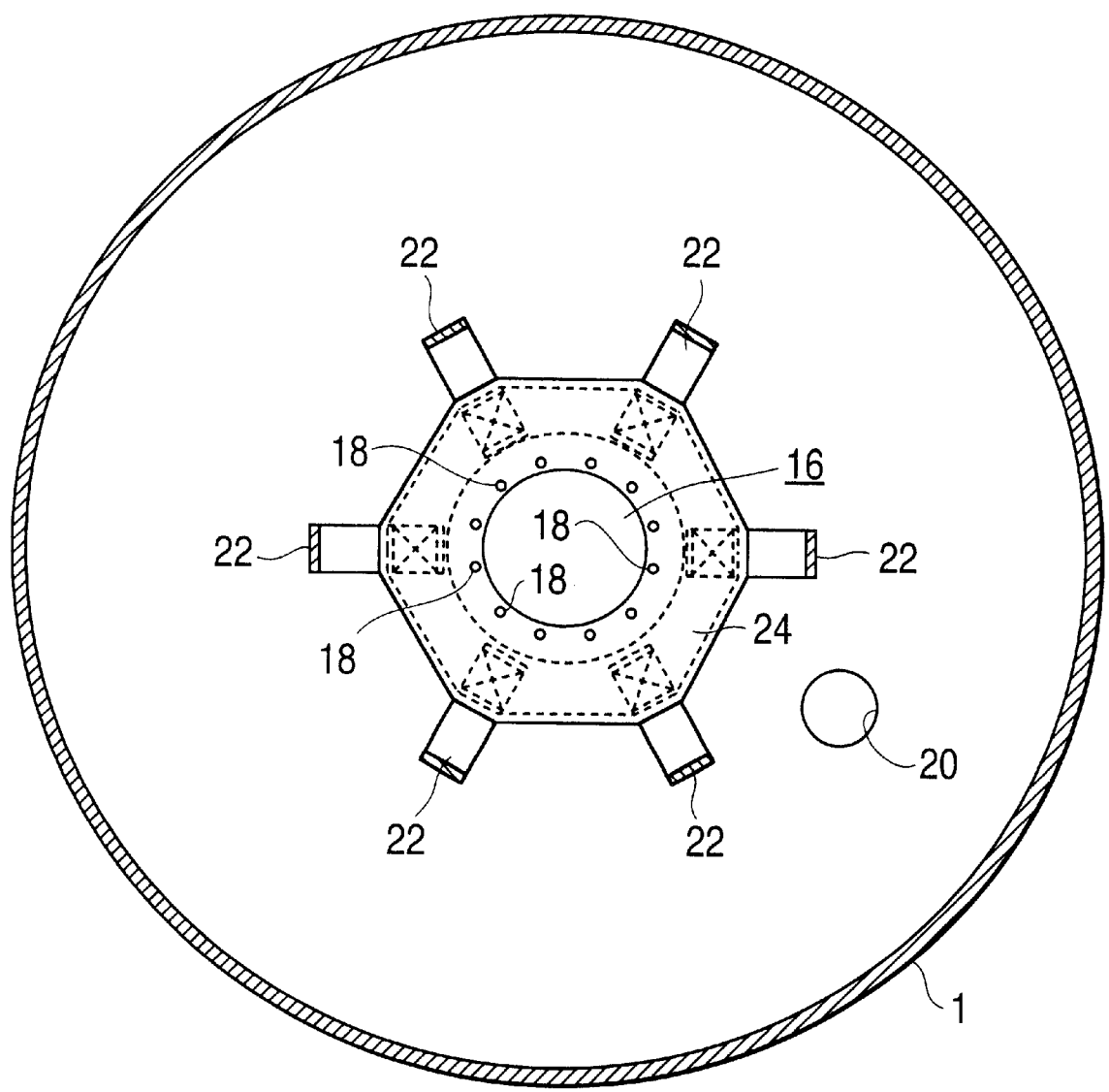
FIG. 8 is a sectional view taken along a line VIII—VIII of FIG. 6.

Each tether belt 68 is an elongated band which is in the same shape as that of FIGS. 6 and 7 and is sewn to the tether belt connecting fabrics 64, 66 at both ends of the tether belt 68 and sewn to the front panel at the center in the longitudinal direction of the tether belt 68. Sewn on the inner surface of the front panel 36 at the center thereof is a patch cloth 69. A sheet 70 for controlling the flow direction of gases from the inflator 54 is rectangular as shown in FIG. 4 and is provided with inflator-inserting openings 72, 74 at both ends in the longitudinal direction of the sheet 70, respectively. The sheet 70 is also provided with bolt through holes 76 and rivet through holes 78 around the inflator-inserting openings 72, 74.

As shown in FIG. 3, the sheet 70 is made in a loop configuration to overlap the opening 72 with the opening 74. As shown in FIG. 1, a ring-like flametight fabric 80 is disposed between the sheet 70 and a holding ring 82. The flametight fabric 80 is provided for preventing high-temperature gases from coming in directly contact with the sheet 70. The flametight fabric 80 is provided with bolt through holes 86 and rivet through holes 88. As apparent from FIG. 1 and FIG. 3, the center of the sheet 70 in the longitudinal direction thereof faces to the inflator-fitting opening 40.

The reinforcing fabrics 60, 62, the tether belt connecting fabrics 64, 66, and the air bag 34 are disposed between the sheet 70 and the retainer 46, then stud bolts 90 of the holding ring 82 are inserted into the bolt through holes 86, 76, 42, 50, 54h, and nuts (not shown) are screwed onto the respective ends of the stud bolts 90. In this way, the sheet 70, the air bag 34, and the inflator 54 are fixed to the retainer 46. The sheet 70 and the air bag 34 can be securely fixed by driving rivets (not shown) through the rivet through holes 92, 78, 44, and 52.

In the driver side air bag having the aforementioned sheet 70, when the inflator 54 is actuated, gases flowing in the upward direction in FIGS. 1 and 2 are altered by the sheet 70 to flow in the lateral direction so that the rate of projecting forward of the front panel 36 is reduced. Therefore, at the moment the tether belts are tensioned, impact applied to the tether belts 68 is reduced. As a result of this, it can be enough even with reduced connection strength between the tether belts 68, the tether belt connecting fabrics 64, 66, and the front panel 36, thereby facilitating the sewing operation of the tether belts 68. In this embodiment, the sheet 70 may be provided with the inflator-inserting openings 72, 74 and is fixed to the retainer 46 around the inflator-inserting openings 72, 74 by the bolts 90 and the rivets, thereby providing high mounting strength of the sheet 70.

Figure 9:
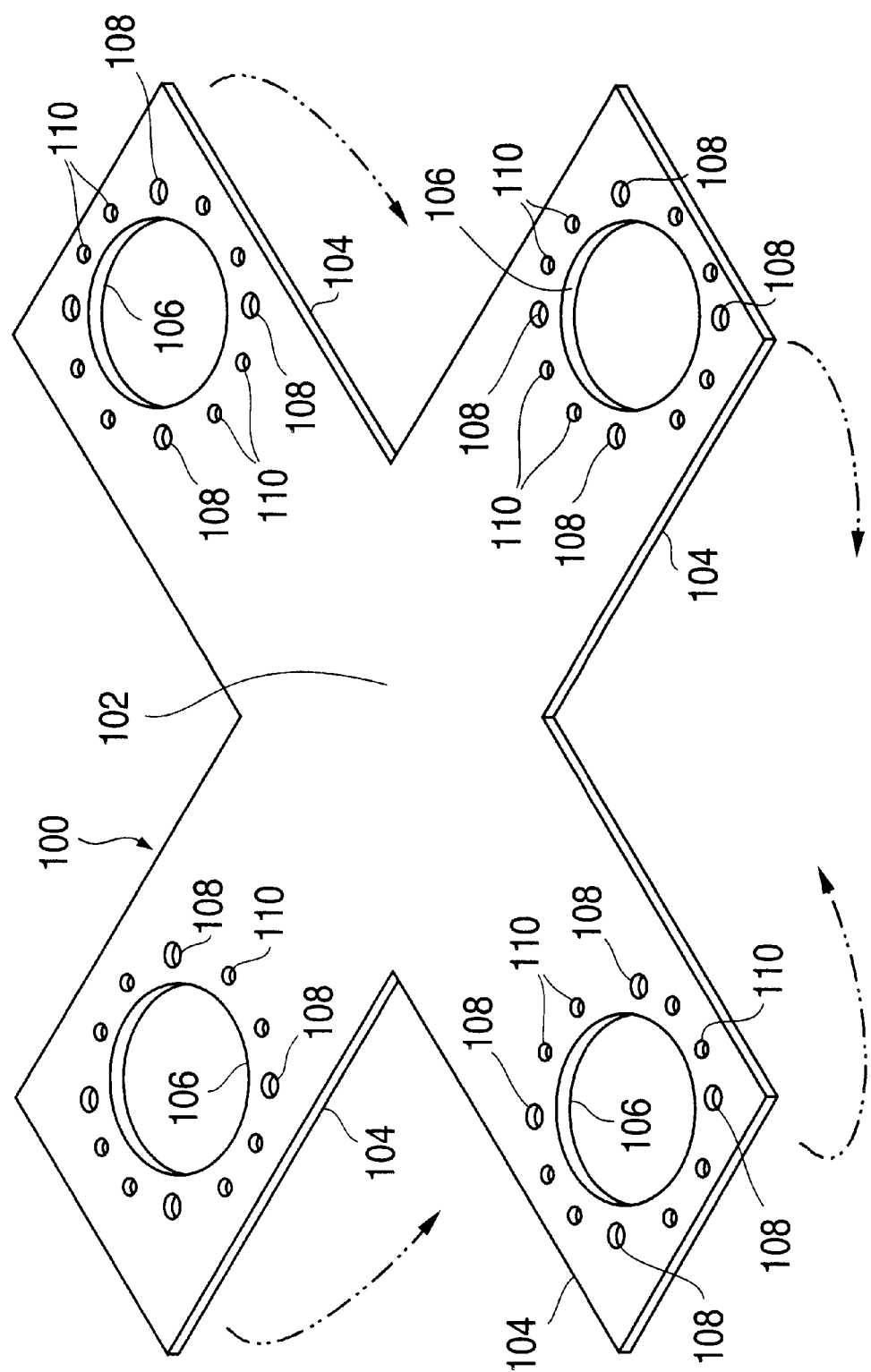
FIG. 9 is a perspective view of a sheet 100.
Figure 10:
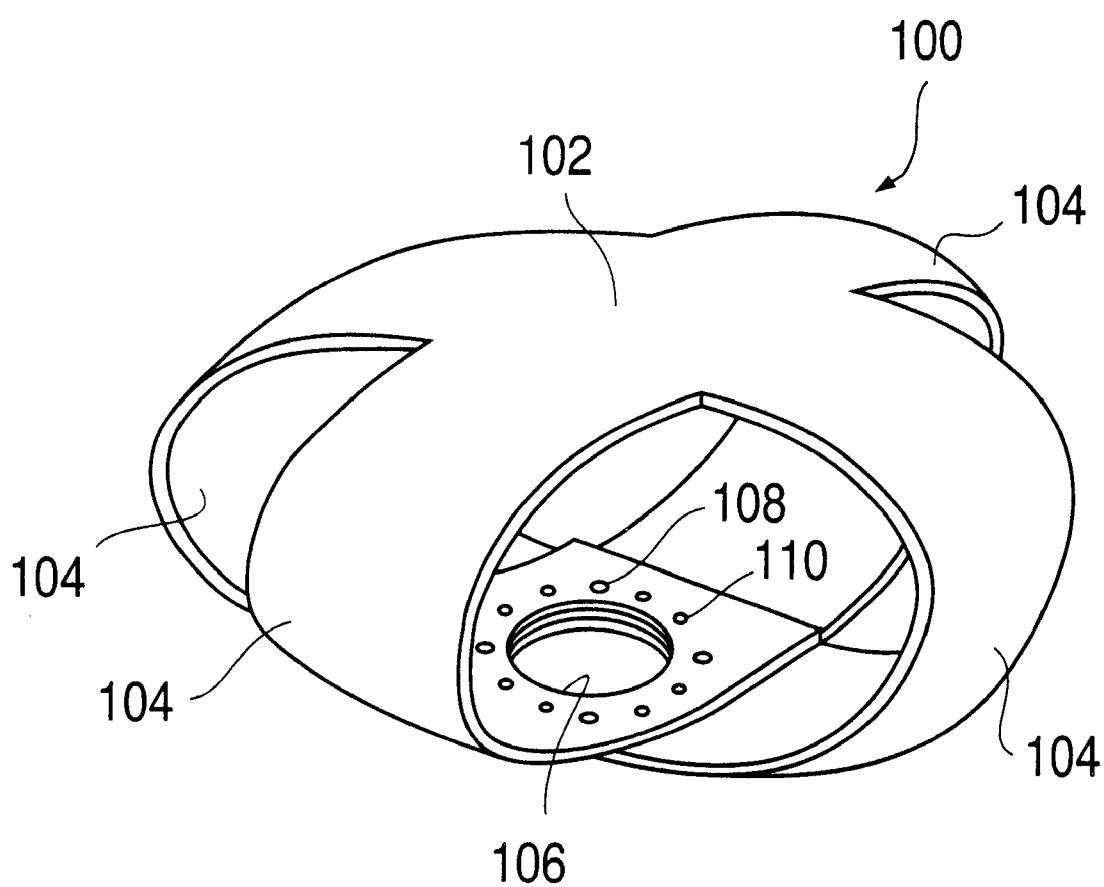
FIG. 10 is a perspective view showing the sheet 100 and a holding ring.

In the present invention, instead of the rectangular sheet 70, a cruciform sheet 100 as shown in FIGS. 9 and 10 may be employed. The sheet 100 may comprise a central portion 102 facing to the inflator-fitting opening 40, extended portions 104 extending from the central portion 102 in four directions, inflator-inserting openings 106 formed in the extended portions 104, respectively, and bolt through holes 108 and rivets through holes 110 formed around the respective inflator-inserting openings 106.

As shown in FIG. 10, the respective extended portions 104 are overlapped in such a manner that the inflator-inserting openings 106 are in positions concentrically to each other and the portion around the inflator-inserting openings 106 are fixed to the retainer by the holding ring.

Impact applied to the tether belts during the deployment of the air bag can be also reduced by this sheet 100, thereby facilitating the sewing operation of the tether belts.

As apparent from FIG. 4 and FIG. 9, the configurations of the sheets 70, 100 are simple and can be manufactured by cutting one sheet so that it can be manufactured easily and at quite lower cost.

As described above, according to the driver side air bag of the present invention, the rate of projecting forward of the front panel during the deployment of the air bag is reduced. Therefore, when the tether belts are disposed inside the air bag, impact applied to the tether belts during the deployment of the air bag can be reduced. The sheet employed in the present invention has a simple structure and is manufactured easily and at low cost.

What is claimed is:

1. A driver side air bag comprising a bag body to be deployed in a circular shape;

an inflator-fitting opening formed in a rear face of said bag body at the center of the rear face; and a rectangular sheet having a central portion facing to said inflator-fitting opening and ends arranged around said inflator-fitting opening, said sheet being disposed inside said bag body;

wherein each end of said sheet includes an inflator-inserting opening, said sheet being positioned so that the inflator-inserting openings overlap and overlie the inflator-fitting opening.

2. A driver side air bag comprising a bag body to be deployed in a circular shape;

an inflator-fitting opening formed in a rear face of said bag body at the center of the rear face; and a cruciform sheet having a central portion facing to said inflator-fitting opening and extended portions extending in four directions from said central portion and being arranged around said inflator-fitting opening, said sheet being disposed inside said bag body;

wherein each extended portion includes an inflator-inserting opening said sheet positioned so that the inflator-inserting openings overlap and overlie the inflator-fitting opening.

3. A driver side air bag as claimed in claim 1, further comprising a holding member positioned around said inflator-fitting opening and passing through each end of said sheet and a front face of said bag body.

4. A driver side air bag as claimed in claim 2, further comprising a holding member positioned around said inflator-fitting opening and passing through each extended portion of said sheet and a front face of said bag body.

5. An air flow controlling member for an airbag comprising:
- a sheet having opposite ends and adapted to be placed in a first condition and a second condition;
- wherein in the first condition the sheet is flat; and
- wherein in the second condition the sheet is folded so that the opposite ends are positioned adjacent each other to form an inflator-fitting opening, and a central portion of the sheet overlies the inflator-fitting opening
- wherein one end of the sheet includes a first opening and the other end of the sheet includes a second opening and when the sheet is in the second condition the first and second openings overlap to form the inflator-fitting opening.

6. The air flow controlling member of claim 5, wherein the sheet is rectangular shaped.

7. The air flow controlling member of claim 5, wherein the sheet is cross-shaped.

8. The air flow controlling member of claim 5, wherein in the first condition the central portion does not overlie the inflator-fitting opening.

9. The air flow controlling member of claim 5, wherein the ends include a plurality of through holes wherein, in the first condition, a surface of the ends and a surface of the central portion of the sheet lie in a common plane.

* * * * *